US012781661B2

(12) United States Patent
Tanaka et al.

(10) Patent No.: US 12,781,661 B2
(45) Date of Patent: Nov. 3, 2026

(54) SUPERCHARGING ASSIST DEVICE AND SUPERCHARGING ASSIST METHOD

(71) Applicant: MITSUBISHI HEAVY INDUSTRIES ENGINE & TURBOCHARGER, LTD., Sagamihara (JP)

(72) Inventors: Kengo Tanaka, Tokyo (JP); Kiyoshi Terakado, Tokyo (JP); Yuki Koshiba, Tokyo (JP); Taro Tamura, Sagamihara (JP); Takashi Ikeda, Tokyo (JP); Shintaro Shuto, Tokyo (JP); Hisao Ogawa, Sagamihara (JP); Hiroyuki Ishida, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 19/160,303

(22) PCT Filed: Oct. 30, 2023

(86) PCT No.: PCT/JP2023/039069
§ 371 (c)(1),
(2) Date: Aug. 27, 2025

(87) PCT Pub. No.: WO2024/202163
PCT Pub. Date: Oct. 3, 2024

(65) Prior Publication Data

US 2026/0251089 A1 Aug. 27, 2026

(30) Foreign Application Priority Data

Mar. 31, 2023 (JP) ................................ 2023-057060

(51) Int. Cl.
*F02B 37/10* (2006.01)
*F02B 37/12* (2006.01)
(Continued)

(52) U.S. Cl.
CPC .............. *F02B 37/10* (2013.01); *F02B 37/12* (2013.01); *F02C 6/12* (2013.01); *F02D 23/00* (2013.01);
(Continued)

(58) Field of Classification Search
CPC .. F02B 37/10; F02B 37/12; F02C 6/12; F02D 23/00; F02D 41/0002; F02D 41/0007
See application file for complete search history.

(56) References Cited

U.S. PATENT DOCUMENTS 8,418,463 B2 * 4/2013 Pursifull ................ F02D 23/00 60/611

FOREIGN PATENT DOCUMENTS

GB 2127095 A * 4/1984 ............ F02D 23/00
JP 2002-122031 A 4/2002
(Continued)

OTHER PUBLICATIONS

International Preliminary Report on Patentability and Written Opinion of the International Searching Authority for International Application No. PCT/JP2023/039069, dated Oct. 9, 2025, with English translation.
(Continued)

*Primary Examiner* — Mary A Davis
(74) *Attorney, Agent, or Firm* — Birch, Stewart, Kolasch & Birch, LLP

(57) ABSTRACT

A supercharging assist device for assisting supercharging of a turbocharger mounted to an emergency diesel power generation set includes: a supply source capable of discharging assist air; an assist air line having a first end connected to the supply source and a second end connected to a compressor of the turbocharger, the assist air line being configured such that the assist air flows through the assist air line from the supply source toward the compressor; a
(Continued)

solenoid valve disposed in the assist air line; and a control device configured to be capable of controlling opening and closing of the solenoid valve. The emergency diesel power generation set is configured such that the engine is operated within a high idle rotation speed range set in advance in a predetermined period until a load is applied to the engine, and the control device is configured to control the solenoid valve to open a first time before a point of time when the load is applied to the engine in the predetermined period.

5 Claims, 6 Drawing Sheets

(51) Int. Cl.

| | |
|---|---|
| ***F02C 6/12*** | (2006.01) |
| ***F02D 23/00*** | (2006.01) |
| ***F02D 41/00*** | (2006.01) |

(52) U.S. Cl.
CPC ..... *F02D 41/0002* (2013.01); *F02D 41/0007* (2013.01)

(56) References Cited

FOREIGN PATENT DOCUMENTS

| | | | | | |
|---|---|---|---|---|---|
| JP | 2014-58958 | A | | 4/2014 | |
| JP | 2016-194284 | A | | 11/2016 | |
| JP | 2018-96368 | A | | 6/2018 | |
| KR | 20060058338 | A | * | 5/2006 | .............. F02B 37/16 |

OTHER PUBLICATIONS

International Search Report for International Application No. PCT/JP2023/039069, dated Dec. 26, 2023, with English translation.

* cited by examiner

SUPERCHARGING ASSIST DEVICE AND SUPERCHARGING ASSIST METHOD

TECHNICAL FIELD

The present disclosure relates to a supercharging assist device and a supercharging assist method for assisting supercharging of a turbocharger mounted to an emergency diesel power generation set.

The present application claims priority based on Japanese Patent Application No. 2023-057060 filed on Mar. 31, 2023 with the Japanese Patent Office, the contents of which are incorporated herein by reference.

BACKGROUND ART

An emergency diesel power generation set is configured to start upon an emergency such as a blackout, and respond to a load required by a generator. Patent Document 1 discloses a control device which maintains and operates an emergency diesel power generation set so as to ensure that a generator generates emergency power upon an emergency.

CITATION LIST

Patent Literature

Patent Document 1: JP2018-096368A

SUMMARY

Problems to be Solved

Meanwhile, an emergency diesel power generation set needs to quickly respond to a load required by a generator (to have a good load application performance). However, for a while after application of a load to an emergency diesel power generation set has started, the energy of exhaust gas supplied to the turbine is low, and thus the amount of air compressed by a compressor is small. Therefore, it may take some time for an emergency diesel power generation set to be in a state where it is possible to respond to a load required by a generator. Furthermore, if the amount of air compressed by the compressor is small, exhaust gas may contain soot or the like, which may generate smoke such as black smoke.

The present disclosure was made in view of the above problem. An object of the present disclosure is to provide a supercharging assist device and a supercharging assist method capable of improve the responsiveness to a load required by a generator and suppressing generation of smoke, upon start of an emergency power generating engine to which a turbocharger is mounted.

Solution to the Problems

To achieve the above object, a supercharging assist device for assisting supercharging of a turbocharger mounted to an emergency diesel power generation set includes: a supply source capable of discharging assist air; an assist air line having a first end connected to the supply source and a second end connected to a compressor of the turbocharger, the assist air line being configured such that the assist air flows through the assist air line from the supply source toward the compressor; a solenoid valve disposed in the assist air line; and a control device configured to be capable of controlling opening and closing of the solenoid valve. The emergency diesel power generation set is configured such that the engine is operated within a high idle rotation speed range set in advance in a predetermined period until a load is applied to the engine, and the control device is configured to control the solenoid valve to open a first time before a point of time when the load is applied to the engine in the predetermined period.

To achieve the above object, in a supercharging assist method for assisting supercharging of a turbocharger mounted to an emergency diesel power generation set, the emergency diesel power generation set includes: a supply source capable of discharging assist air; an assist air line having a first end connected to the supply source and a second end connected to a compressor of the turbocharger, the assist air line being configured such that the assist air flows through the assist air line from the supply source toward the compressor; and a solenoid valve disposed in the assist air line. The emergency diesel power generation set is configured such that the engine is operated within a high idle rotation speed range set in advance in a predetermined period until a load is applied to the engine, and the method includes a step of opening the solenoid valve a first time before a point of time when the load is applied to the engine in the predetermined period.

Advantageous Effects

According to the supercharging assist device and the supercharging assist method of the present disclosure, it is possible to improve the responsiveness to a load required by a generator and suppress generation of smoke, upon start of an emergency power generating engine to which a turbocharger is mounted.

DETAILED DESCRIPTION

A supercharging assist device and a supercharging assist method according to embodiments of the present disclosure will now be described with reference to the accompanying drawings. Each embodiment illustrates an aspect of the present disclosure and does not limit the present disclosure. The embodiment may be modified within the scope of the technical ideas of the present disclosure.

Figure 1:
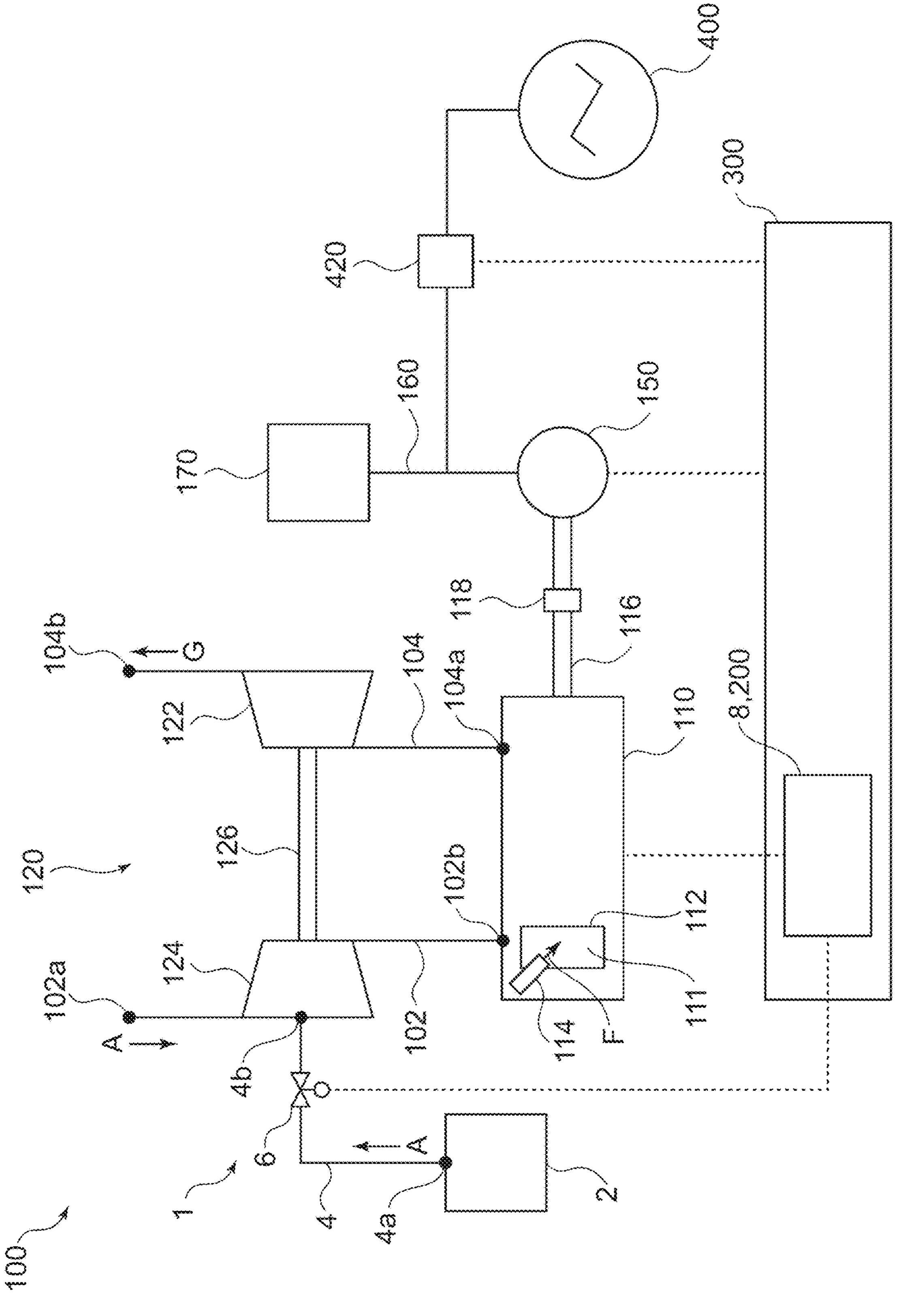
FIG. 1 is a schematic configuration diagram of an emergency diesel power generation set including a supercharging assist device according to an embodiment.

FIG. 1 is a schematic configuration diagram of an emergency diesel power generation set 100 including a supercharging assist device 1 according to an embodiment. The emergency diesel power generation set 100 is installed in commercial facilities, hotels, hospitals, data centers, etc., along with an emergency generator 150. The emergency diesel power generation set 100 starts the emergency generator 150 upon an emergency such as a blackout and generates emergency power. In an embodiment, as illustrated in FIG. 1, the emergency diesel power generation set 100 includes an intake line 102, an exhaust gas line 104, an engine 110, a turbocharger 120, an engine control device 200, and a supercharging assist device 1.

Air A supplied to the engine 110 flows through the intake line 102. The intake line 102 has a first end 102 *a* at the upstream side in the flow direction of the air A opening to the atmosphere and a second end 102*b* at the downstream side in the flow direction of the air A connected to the engine 110. Exhaust gas G discharged from the engine 110 flows through the exhaust gas line 104. The exhaust gas line 104 has a first end 104*a* at the upstream side in the flow direction of the exhaust gas G connected to the engine 110 and a second end 104*b* at the downstream side in the flow direction of the exhaust gas G opening to the atmosphere.

The engine 110 includes a cylinder 112 inside which a combustion chamber 111 is formed, a fuel injection device 114 which injects a fuel F into the combustion chamber 111, a crank shaft 116 which converts the reciprocating motion of a non-depicted piston disposed in the combustion chamber 111 into the rotation motion, and a transmission device 118 (clutch) capable of switching transmission of the rotation motion of the crank shaft 116. The air A supplied to the engine 110 flows into the combustion chamber 111 of the cylinder 112 and mixes with the fuel F. The cylinder 112 discharges the exhaust gas G after combustion of the fuel F. An emergency generator 150 configured to be capable of generating power from the rotation motion of the crank shaft 116 is connected to the crank shaft 116. The emergency generator 150 supplies electrical power to an emergency facility 170 via an electrical power supply grid 160.

In the present disclosure, the rotation speed of the crank shaft 116 (hereinafter, referred to as the rotation speed N) is described as the rotation speed of the engine 110 (the number of rotation). In some embodiments, the rotation speed of the engine 110 is calculated by a predetermined method from the rotation speed of the crank shaft 116. The rotation speed of the engine 110 may be obtained or calculated from a constituent element of the engine 110 other than the crank shaft 116.

The turbocharger 120 includes a turbine 122 disposed in the exhaust gas line 104, a compressor 124 disposed in the intake line 102, and a rotational shaft 126 connecting the turbine 122 and the compressor 124. The power of the turbine 122 driven to rotate by the exhaust gas G flowing through the exhaust gas line 104 is transmitted to the compressor 124 via the rotational shaft 126, and the compressor 124 compresses the air A flowing through the intake line 102.

Although not depicted, the emergency diesel power generation set 100 may further include an air filter for removing foreign substances such as dust from the air A taken into the intake line 102, the air filter being disposed closer to the upstream side of the intake line 102 than the compressor 124. Although not depicted, the emergency diesel power generation set 100 may further include an inter cooler for cooling the air A heated by the compressor 124, the inter cooler being disposed closer to the downstream side of the intake line 102 than the compressor 124.

The engine control device 200 is connected electrically to the engine 110, and controls operation of the engine 110. The engine control device 200 as described above is a computer such as an electronic control device, and includes a non depicted processor such as CPU and GPU, a memory such as ROM and RAM, and an I/O interface, for instance. The engine control device 200 implements the functional parts of the engine control device 200 as the processor operates (e.g., calculates) in accordance with program commands loaded to the memory.

Figure 2:
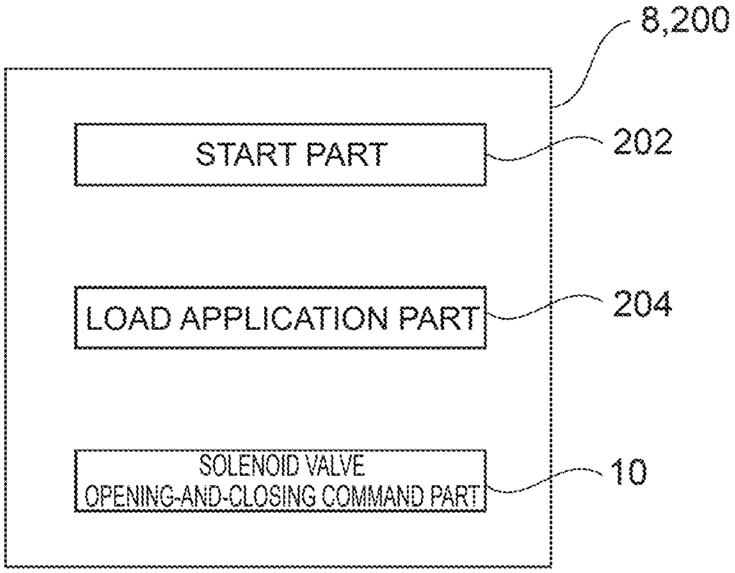
FIG. 2 is a functional block diagram schematically illustrating an engine control device according to an embodiment.
Figure 3:
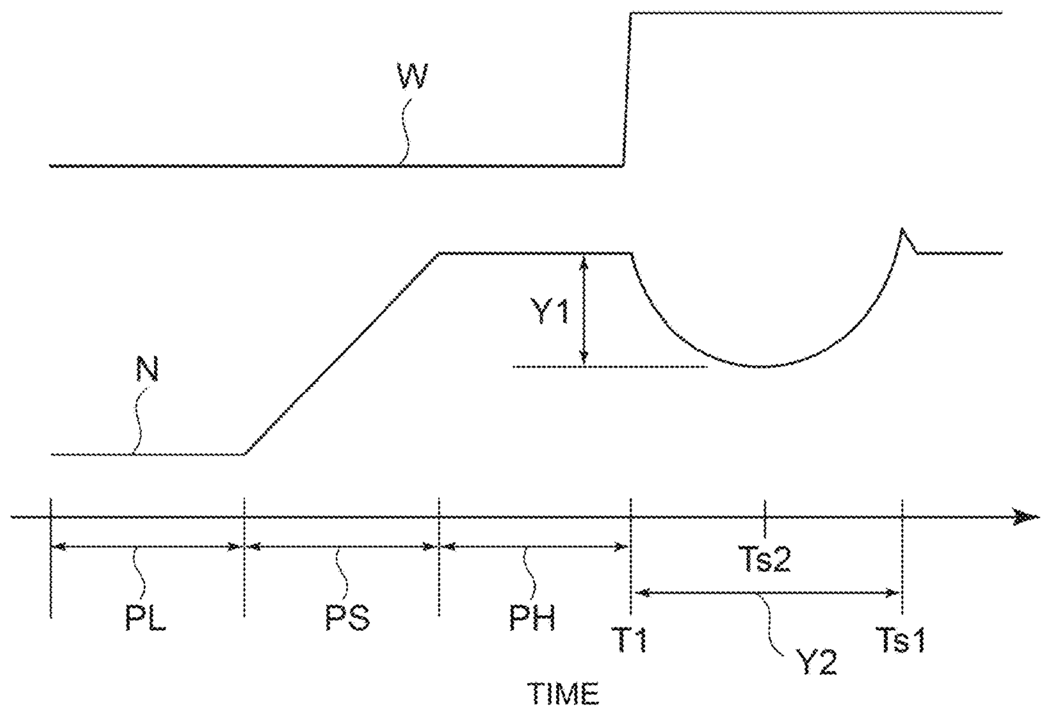
FIG. 3 is a diagram for describing an example of temporal change of the rotation speed of the engine according to an embodiment.

FIG. 2 is a functional block diagram schematically illustrating an engine control device 200 according to an embodiment. FIG. 3 is a diagram for describing an example of temporal change of the rotation speed N (rotation speed of the engine 110) and the necessary load W (load applied to the emergency generator 150) according to an embodiment. FIG. 3 illustrates the rotation speed N in a case where the supercharging assist device 1 is not provided for the emergency diesel power generation set 100 (a case where supercharging of the turbocharger 120 is not assisted).

As depicted in FIG. 2, the engine control device 200 includes a start part 202 and a load application part 204.

Upon an emergency such as a blackout, the connection between a commercial grid 400 and the electrical power supply grid 160 is cut off by a circuit breaker 420. A power generation set integration control device 300 receives a power supply command for the emergency facility 170 via the circuit breaker 420. The start part 202 of the power generation set integration control device 300 sends an engine start signal to the engine control device 200 upon receiving a power supply command, and injects a fuel F to the fuel injection device 114 to start the engine 110. A control sequence determined in advance is incorporated into the power generation set integration control device 300, and on the basis of the control sequence, the engine 110 operates a low idle operation (about 600 rpm) and a high idle operation (about 1500 rpm) where the rotation speed N is higher than that in the low idle operation. The engine 110 is operated within a preset high idle rotation speed range of 1500 rpm±10 rpm, for instance.

As depicted in FIG. 3, the engine 110 operates under a low idle operation in a preset low idle operation period PL, and after a transition period PS, transitions to a high idle operation. Following the transition to the high idle operation, after the elapse of a preset high idle operation period PH, the operation transitions to a load application step, and a necessary load W required for starting the emergency facility 170 is applied to the emergency generator 150. As the necessary load W is applied to the emergency generator 150, an engine load corresponding to the necessary load W is applied to the engine 110 at the same time, or immediately after. The engine load gradually increases compared to the necessary load W (see FIGS. 3 and 5). An engine load is not applied to the engine 110 during the low idle operation and the high idle operation.

As depicted in FIG. 3, the rotation speed N temporarily decreases from the timing T1 when the necessary load W is applied to the emergency generator 150 (the point of time when application of the load is started). At the load application part 204, the engine control device 200 increases the fuel injection amount so as to reduce the rotation speed N of the engine 110 to the original rotation speed N (about 1500 rpm). The engine load increases with an increase in the fuel injection amount, and the rotation speed of the turbocharger 120, the air supply pressure, and the air supply amount increase with an increase in the exhaust gas temperature and the exhaust gas energy. The air supply amount increases following the increase in the fuel injection amount, and thus the air excess ratio in the cylinder 112 decreases, and the concentration of discharged smoke increases.

In the present disclosure, as depicted in FIG. 3, Ts1 is the timing when the rotation speed N having decreased from the timing T1 returns to the original rotation speed N (the rotation speed N at the timing T1) and has become stable (the rotation speed recovery point). Between the timing T1 and the timing Ts1, Ts2 is the timing when the rotation speed N is the smallest (the rotation speed smallest point). The difference between the rotation speed N at the timing T1 and the rotation speed N at the timing Ts2 is a decrease amount Y1. In other words, the decrease amount Y1 is the magnitude of a decrease in the rotation speed N in response to application of the engine load to the engine 110. The time from the timing T1 to the timing Ts1 (the time until returning to the original rotation speed N) is the recovery time Y2. When the decrease amount Y is small and the recovery time Y2 is short, it means that the load application performance of the emergency diesel power generation set 100 is improved.

Supercharging Assist Device

Configuration

Referring to FIG. 1 again, the supercharging assist device 1 according to an embodiment will be described. The supercharging assist device 1 assists supercharging of the turbocharger 120. As depicted in FIG. 1, the supercharging assist device 1 includes a supply source 2, an assist air line 4, a solenoid valve 6, and a control device 8.

The supply source 2 is configured to be capable of discharging assist air A. In an embodiment, the supply source 2 is an air tank storing compressed air A. The air tank is configured to be attachable to and removable from the assist air line 4, and thus replaceable. In some embodiments, the supply source 2 is an air line through which the air A flows. In this case, the supercharging assist device 1 extracts a part of the air A flowing through the air line via the assist air line 4.

The assist air line 4 has a first end 4*a* connected to the supply source 2 and a second end 4*b* connected to the compressor 124 of the turbocharger 120. The assist air line 4 is configured such that the assist air flows through the assist air line 4 from the supply source 2 toward the compressor 124. In an embodiment, the second end 4*b* of the assist air line 4 has an opening toward the compressor impeller of the compressor 124. Thus, the assist air A is injected toward the compressor impeller. With the above configuration, it is possible to increase the amount of air A supplied to the engine 110 and increase the rotation speed of the turbocharger 120.

The solenoid valve 6 is disposed in the assist air line 4. The solenoid valve 6 is connected electrically to the control device 8, and opens or closes in response to a command sent from the control device 8. When the solenoid valve 6 opens, the air A stored in the supply source 2 flows through the assist air line 4 toward the compressor 124, and is injected onto the compressor impeller of the compressor 4. When the solenoid valve 6 closes, inflow of the assist air A to the compressor 124 from the supply source 2 stops.

The control device 8 is configured to be capable of controlling opening and closing of the solenoid valve 6. The control device 8 as described above is a computer such as an electronic control device, and includes a non depicted processor such as CPU and GPU, a memory such as ROM and RAM, and an I/O interface, for instance. The control device 8 implements the functional parts of the control device 8 as the processor operates (e.g., calculates) in accordance with program commands loaded to the memory. In an embodiment, the engine control device 200 and the control device 8 are provided integrally. In other words, the above described engine control device 200 includes the functions of the control device 8. In some embodiments, the engine control device 200 and the control device 8 are provided separately.

Figure 4:
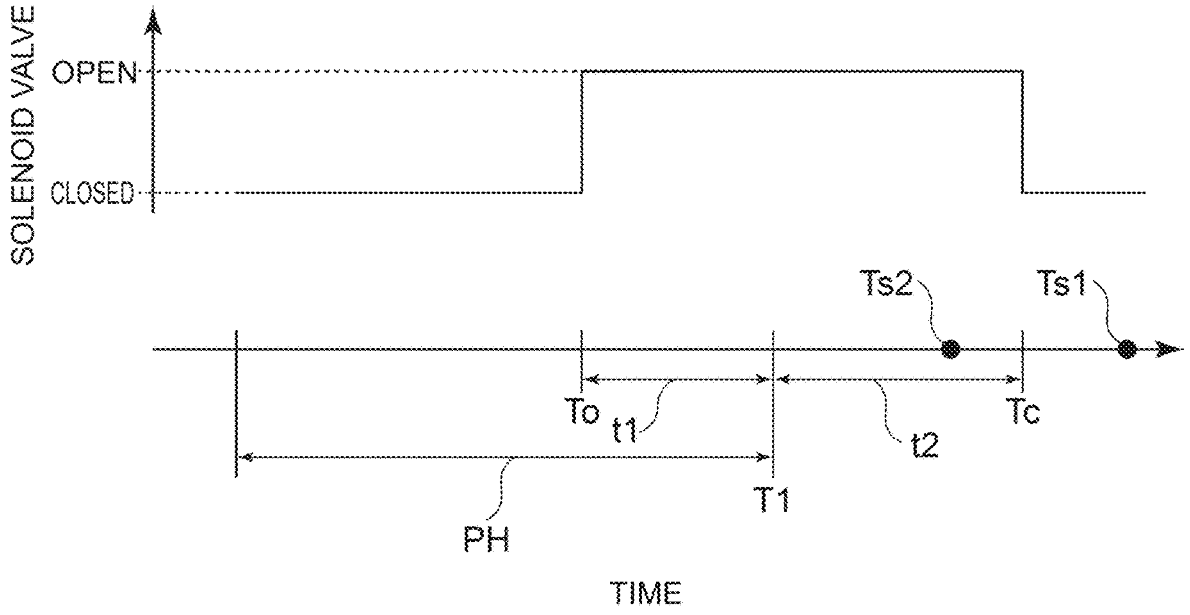
FIG. 4 is a diagram showing a period in which a solenoid valve according to an embodiment opens and closes.

As depicted in FIG. 2, the control device 8 includes a solenoid valve opening-and-closing command part 10 which commands the solenoid valve 6 to open and close. FIG. 4 is a diagram showing a period in which a solenoid valve 6 according to an embodiment opens and closes. The solenoid valve opening-and-closing command part 10 commands the solenoid valve 6 to open the first time t1 before the timing T1 (the point of time when a load is applied to the emergency generator 150) in the high idle period PH. The solenoid valve 6 remains open from the first time t1 before the timing T1 (hereinafter, the solenoid valve opening timing To) to the timing T1. That is, the assist air A flows into the compressor 124 starting before the engine load is applied to the engine 110 (see FIG. 6(*a*)). In an embodiment, the first time t1 is not less than one second and less than ten seconds.

In an embodiment, the solenoid valve opening-and-closing command part 10 commands the solenoid valve 6 to close the second time t2 after the timing T1. The solenoid valve 6 remains open until the second time t2 after the timing T1 (hereinafter, the solenoid valve closing timing Tc). That is, the assist air A continues to flow into the compressor 124 until the second time t2 elapses after the start of application of the engine load to the engine 110 (see FIG. 6(*a*)).

As described above referring to FIG. 3, the rotation speed N temporarily decreases from the timing T1, increases again at the timing Ts2, and then returns to the original rotation speed N at the timing Ts1. In an embodiment, the second time t2 is longer than the period between the timing T1 and the timing Ts2. In other words, the solenoid valve 6 is closed after passing the timing Ts2. In an embodiment, the solenoid valve 6 is closed before the timing Ts1.

Advantageous Effects

Figure 5:
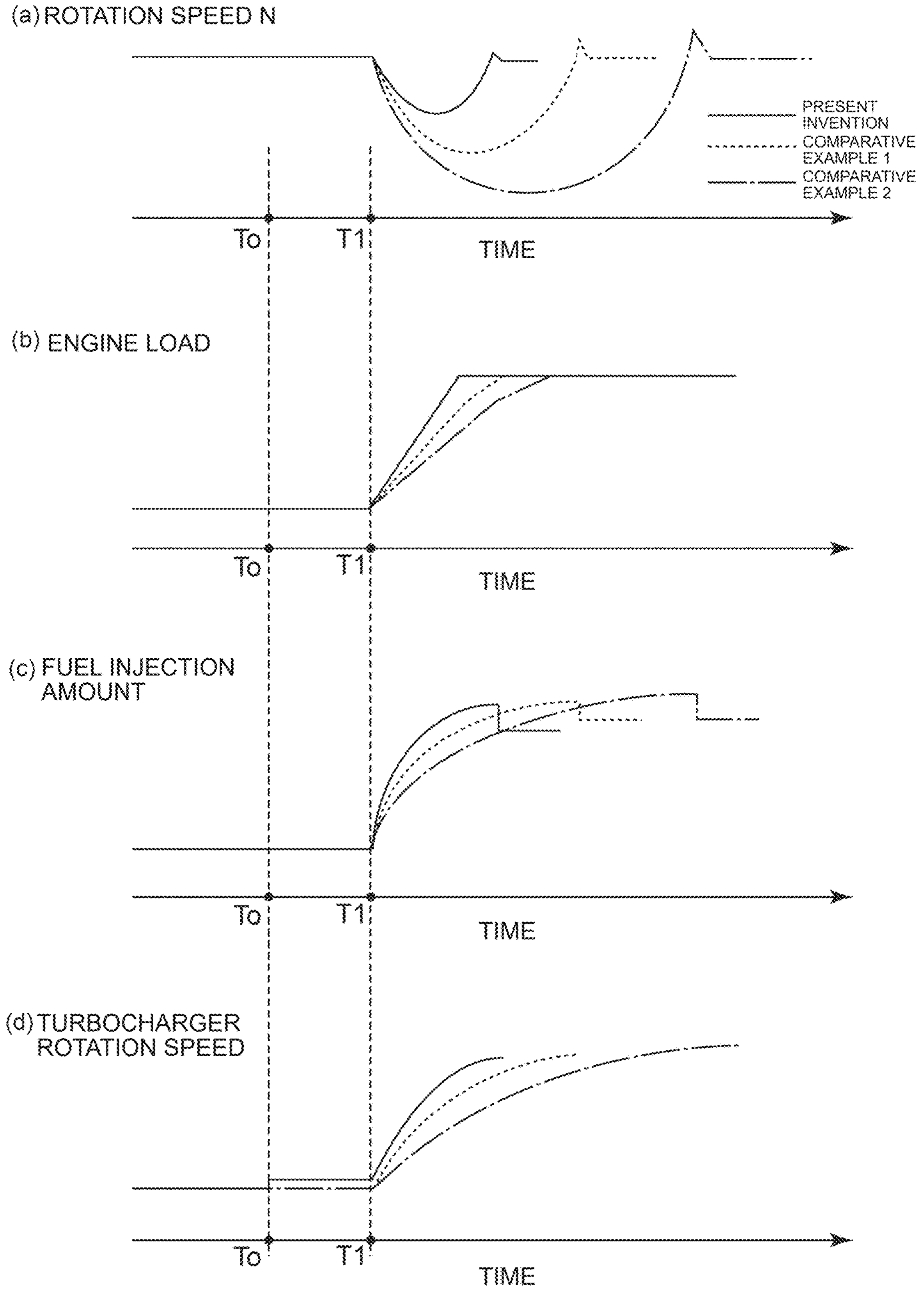
FIG. 5 is a diagram for describing the advantageous effects of a supercharging assist device according to an embodiment.
Figure 6:
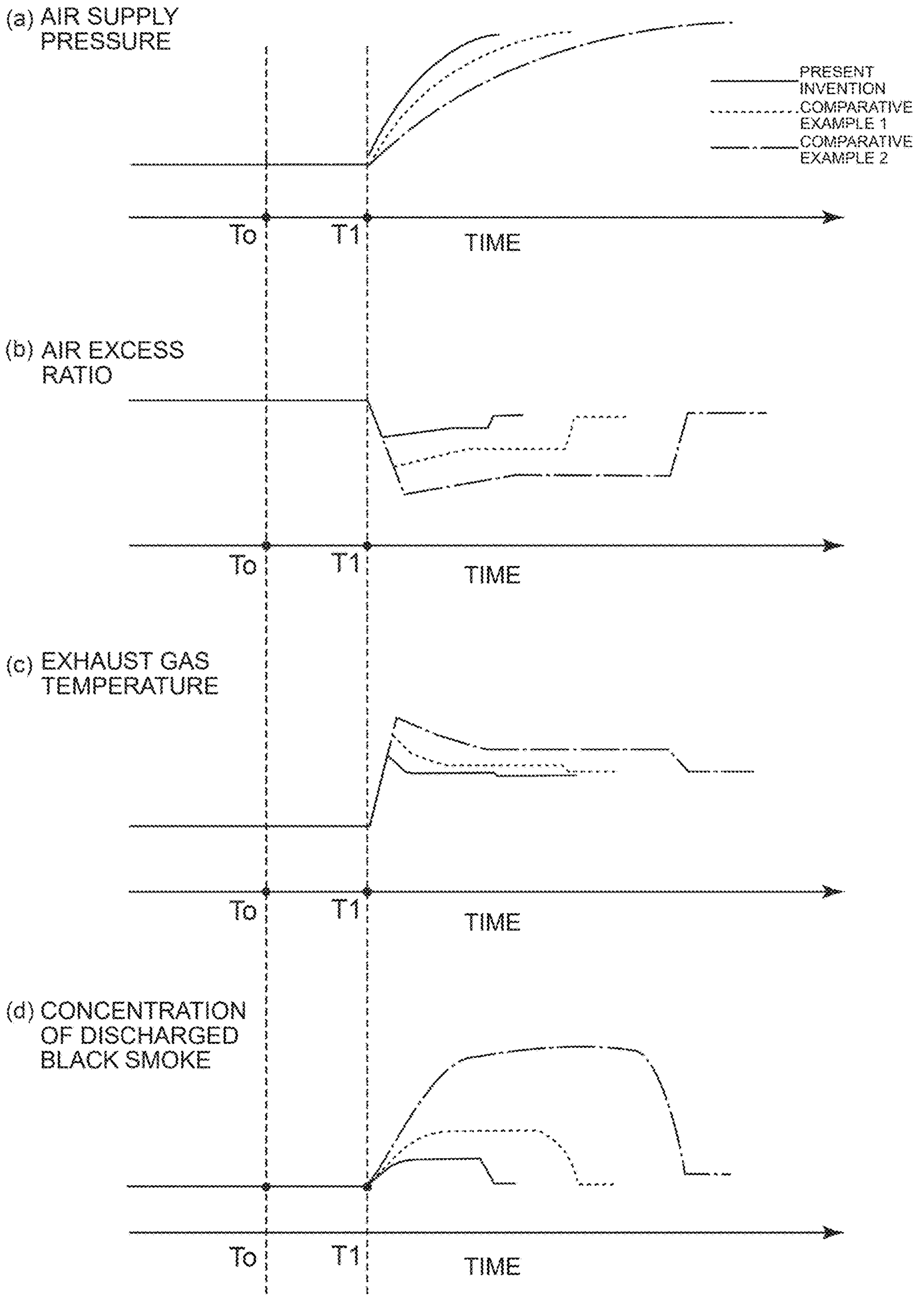
FIG. 6 is a diagram for describing the advantageous effects of a supercharging assist device according to an embodiment.

The advantageous effects of a supercharging assist device 1 according to an embodiment will be described. FIGS. 5 and 6 are each a diagram for describing the advantageous effects of a supercharging assist device 2 according to an embodiment, showing the temporal change of the observation targets. FIG. 5 (*a*) shows the temporal change of the rotation speed N. FIG. 5 (*b*) shows the temporal change of the load applied to the engine 110. FIG. 5 (*c*) shows the temporal change of the amount of the fuel F injected from the fuel injection device 114. FIG. 5 (*d*) shows the temporal change of the rotation speed of the turbocharger 120 (the rotation speed of the rotational shaft 126). FIG. 6 (*a*) shows the temporal change of the pressure of the air A supplied to the engine 110 (supply air pressure). FIG. 6 (*b*) shows the temporal change of the value calculated on the basis of the amount of the air A and the amount of the fuel F in the combustion chamber 111 (air excess ratio). FIG. 6 (*c*) shows the temporal change of the temperature of the exhaust gas G supplied to the turbine 122. FIG. 6 (*d*) shows the temporal change of the concentration of discharged black smoke.

In each of FIGS. 5 and 6, the dash-dotted line indicates the temporal change of the observation targets in a case where the supercharging assist device 1 is not provided (comparative example 1), and the dotted line indicates the temporal change of the observation targets in a case where the supercharging assist device 1 is provided but the solenoid valve 6 is opened at the timing T1 (comparative example 2).

As depicted in the comparative example 2 of FIGS. 5 and 6, for a while after the timing T1 when the engine load is applied to the engine 110, the temperature of the exhaust gas G discharged from the engine 110 is low, and the power of the turbine 122 transmitted to the compressor 124 is small. Thus, the amount of air A supplied to the engine 110 is small and the rotation speed of the turbocharger 120 is low. When the amount of air A supplied to the engine 110 is small and the rotation speed of the turbocharger 120 is low, the decrease amount Y1 of the rotation speed N increases, and the recovery time Y2 becomes longer.

In an embodiment, the solenoid valve 6 is opened the first time t1 before the timing T1, and thus the assist air A flows into the compressor 124 as depicted in FIGS. 6 (*a*) and (*b*), and the amount of the air A supplied to the engine 110 is increased. Thus, as depicted in FIG. 5 (*d*), it is possible to increase the turbocharger rotation speed before the timing T1. Thus, as depicted in FIG. 5 (*a*), compared to the comparative example 1 and the comparative example 2, it is possible to suppress a decrease in the rotation speed N due to application of the engine load to the engine 110, and shorten the recovery time Y2. In other words, it is possible to improve the load application performance of the emergency diesel power generation set 100. Thus, it is possible to improve the engine load responsiveness of the engine 110 to the necessary load W for the emergency generator 150.

As depicted in FIG. 6 (*d*), if the amount of the air A supplied to the engine 110 is small for a while after the T1 when the load is applied to the engine 110, the fuel F is not fully combusted and the exhaust gas G contains soot or the like, which may lead to generation of smoke such as black smoke. According to an embodiment, the solenoid valve 6 is opened the first time t1 before the timing T1, and thus the assist air A flows into the compressor 124 as depicted in FIGS. 6 (*a*) and (*b*), and the amount of the air A supplied to the engine 110 is increased. Thus, as depicted in FIG. 6 (*d*), it is possible to suppress discharge of black smoke. According to an embodiment, as depicted in FIG. 5 (*c*), it is possible to suppress the amount of the fuel F.

According to an embodiment, the assist air A continues to flow into the compressor 124 until the second time t2 elapses after the timing T1. Thus, it is possible to supply the assist air A continuously to the compressor 124 until the temperature of the exhaust gas G (energy) becomes sufficiently high.

According to an embodiment, the solenoid valve 6 is closed after passing the timing Ts2, and thus it is possible to prevent the engine 110 from stopping operation due to a continuous decrease of the rotation speed N.

If the first time t1 is shorter than one second, the amount of the air A supplied to the engine 110 may become insufficient at the timing T1. On the other hand, even if the first time t1 is longer than ten seconds, it is not possible to achieve the effect to increase the amount of the air A per unit hour supplied to the engine 110 and the effect to increase the rotation speed of the turbocharger 120, which may lead to excess of the assist air A. According to an embodiment, the first time t1 is not less than one second and less than ten seconds, and thus it is possible to secure a sufficient amount of the air A supplied to the engine 110 at the timing T1 and suppress generation of excess of the assist air A.

Supercharging Assist Method

Figure 7:
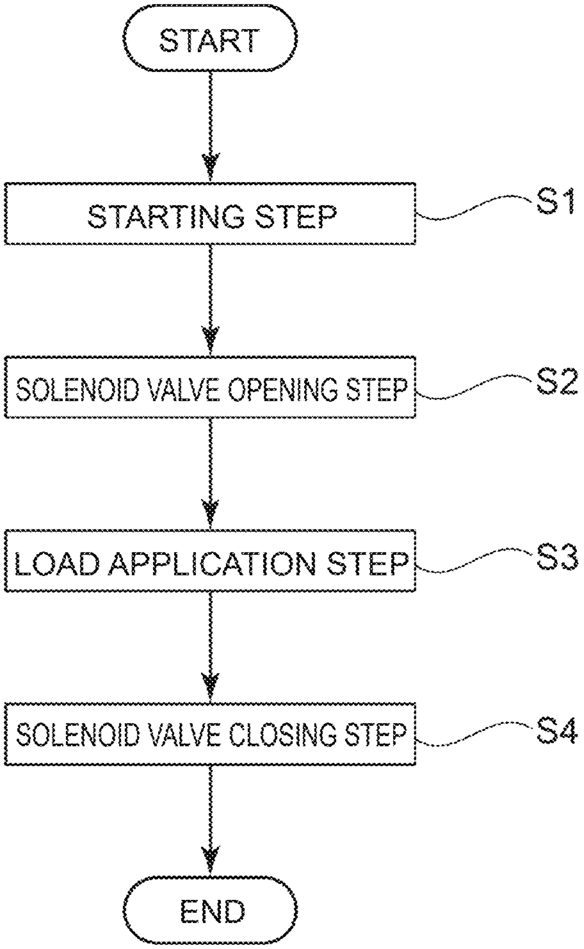
FIG. 7 is a flowchart of a supercharging assist method according to an embodiment.

FIG. 7 is a flowchart of a supercharging assist method according to an embodiment. As depicted in FIG. 7, the supercharging assist method includes a starting step S1, a solenoid valve opening step S2, a load application step S3, and a solenoid valve closing step S4.

The starting step S1 starts the engine 110 upon an emergency such as a blackout. The engine 110 operates the low idle operation and the high idle operation in this order on the basis of the control sequence as described above. The load application step S3 applies the necessary load W required by the emergency generator 150 to the engine 110.

The solenoid valve opening step S2 opens the solenoid valve 6 the first time t1 before the timing T1 when the load application step S3 is performed (the point of time when an engine load is applied to the engine 110) in the high idle period PH. The solenoid valve closing step S4 closes the solenoid valve 6 the second time 12 after the timing T1.

According to the supercharging assist method depicted in FIG. 7, the solenoid valve 6 is opened the first time t1 before the timing T1 when the load is applied to the engine 110, and thus the assist air A flows into the compressor 124, and the amount of the air A supplied to the engine 110 is increased. Thus, it is possible to suppress a decrease in the rotation speed N due to application of the load to the engine 110, and shorten the recovery time Y2. In other words, it is possible to improve the load application performance of the emergency diesel power generation set 100. Thus, it is possible to improve the engine load responsiveness of the engine 110 to the necessary load W for the emergency generator 150.

According to the supercharging assist method depicted in FIG. 7, the solenoid valve 6 is opened the first time t1 before the timing T1, and thus the assist air A flows into the compressor 124, and the amount of the air supplied to the engine 110 is increased. Thus, it is possible to suppress the generation of smoke.

The contents described in the above respective embodiments can be understood as follows, for instance.

(1) A supercharging assist device (1) according to the present disclosure is a supercharging assist device for assisting supercharging of a turbocharger (120) mounted to an emergency diesel power generation set (100) and includes: a supply source (2) capable of discharging assist air (A); an assist air line (4) having a first end (4*a*) connected to the supply source and a second end (4*b*) connected to a compressor (124) of the turbocharger, the assist air line being configured such that the assist air flows through the assist air line from the supply source toward the compressor; a solenoid valve (6) disposed in the assist air line; and a control device (8) configured to be capable of controlling opening and closing of the solenoid valve, the emergency diesel power generation set is configured such that the engine is operated within a high idle rotation speed range set in advance in a predetermined period until a load is applied to the engine (110), and the control device is configured to control the solenoid valve to open a first time (t1) before a point of time (T1) when the load is applied to the engine in the predetermined period.

For a while after the engine load is applied to the engine, the energy of the exhaust gas discharged from the engine is low, and the power of the turbine transmitted to the compressor is small. Thus, the amount of air compressed by the compressor is small, and the amount of air supplied to the engine is small. When the amount of air supplied to the engine is small, the rotation of the turbocharger is also small, and the decrease amount of the rotation speed of the engine in response to the application of the load required for the engine by the generator increases, and the time until the rotation speed of the engine returns to the high idle rotation speed range becomes longer. According to the above configuration (1), the solenoid valve is opened the first time before the timing when the load is applied to the engine, and thus the assist air flows into the compressor, and the amount of the air supplied to the engine is increased. Thus, it is possible to suppress a decrease in the rotation speed of the engine due to application of the load to the engine, and shorten the time until the rotation speed of the engine returns to the high idle rotation speed range. Thus, it is possible to improve the responsiveness of the engine to the necessary load required by the generator.

If the amount of the air supplied to the engine is small for a while after the load is applied to the engine, the fuel is not fully combusted and the exhaust gas contains soot or the like, which may lead to generation of smoke such as black smoke. According to the above configuration (1), the solenoid valve is opened the first time before the point of time when the load is applied to the engine, and thus the assist air flows into the compressor, and the amount of the air supplied to the engine increases. Thus, it is possible to suppress generation of smoke.

(2) In some embodiments, in the above configuration (1), the control device is configured to control the solenoid valve to close a second time (t2) after the point of time when the load is applied to the engine.

With the above configuration (1), it is possible to supply the assist air continuously to the compressor until the energy of the exhaust gas becomes sufficiently high.

(3) In some embodiments, in the above configuration (2), the second time is longer than a period of time from the point of time when the load is applied to the engine until when a rotation speed (N) of the engine changes from decreasing to increasing.

With the above configuration (3), it is possible to prevent the engine from stopping operation due to a continuous decrease of the rotation speed of the engine.

(4) In some embodiments, in any one of the above methods (1) to (3), the first time is not less than one second and less than ten seconds.

If the first time is shorter than one second, the amount of the air supplied to the engine may become insufficient at the timing when the load is applied to the engine. On the other hand, even if the first time is longer than ten seconds, it is not possible to achieve the effect to increase the amount of the air per unit hour supplied to the engine and the effect to increase the rotation speed of the turbocharger, which may lead to generation of excess assist air. According to the above configuration (4), it is possible to secure a sufficient amount of the air supplied to the engine at the timing when the load is applied to the engine and suppress generation of excess assist air, (5) A supercharging assist method according to the present disclosure is a supercharging assist method for assisting supercharging of a turbocharger mounted to an emergency diesel power generation set, the emergency diesel power generation set includes: a supply source capable of discharging assist air; an assist air line having a first end connected to the supply source and a second end connected to a compressor of the turbocharger, the assist air line being configured such that the assist air flows through the assist air line from the supply source toward the compressor; and a solenoid valve disposed in the assist air line. The emergency diesel power generation set is configured such that the engine is operated within a high idle rotation speed range set in advance in a predetermined period until a load is applied to the engine, and the method includes a step (S2) of opening the solenoid valve a first time before a point of time when the load is applied to the engine in the predetermined period.

For a while after the engine load is applied to the engine, the energy of the exhaust gas discharged from the engine is low, and the power of the turbine transmitted to the compressor is small. Thus, the amount of air compressed by the compressor is small, and the amount of air supplied to the engine is small. When the amount of air supplied to the engine is small, the rotation speed of the turbocharger is low, and the decrease amount of the rotation speed of the engine due to the application of the load required for the engine by the generator increases, and the time until the rotation speed of the engine returns to the high idle rotation speed range becomes longer. According to the above configuration [5], the solenoid valve is opened the first time before the timing when the load is applied to the engine, and thus the assist air flows into the compressor, and the amount of the air supplied to the engine is increased. Thus, it is possible to suppress a decrease in the rotation speed of the engine due to application of the load to the engine, and shorten the time until the rotation speed of the engine returns to the high idle rotation speed range. Thus, it is possible to improve the responsiveness of the engine to the necessary load required by the generator.

If the amount of air supplied to the engine is small for a while after application of the load to the engine is started, the fuel is not fully combusted and the exhaust gas contains soot or the like, which may lead to generation of smoke such as black smoke. According to the above configuration [5], the solenoid valve is opened the first time before the point of time when the load is applied to the engine, and thus the assist air flows into the compressor, and the amount of the air supplied to the engine is increased. Thus, it is possible to suppress generation of smoke.

DESCRIPTION OF REFERENCE NUMERAL

1 Supercharging assist device
2 Supply source
4 Assist air line
6 Solenoid valve
8 Control device
10 Solenoid valve opening-and-closing command part
100 Emergency diesel power generation set
102 Intake line
104 Exhaust gas line
110 Engine
111 Combustion chamber
112 Cylinder
114 Fuel injection device
116 Crank shaft
118 Transmission device
120 Turbocharger
122 Turbine
124 Compressor
126 Rotational shaft
150 Emergency generator
160 Electrical power supply grid
170 Emergency facility
200 Engine control device
202 Start part
204 Load application part
300 Power generation set integration control device
400 Commercial grid
420 Circuit breaker A Air
F Fuel
G Exhaust gas
N Rotation speed
PH High idle period (predetermined period)
PL Low idle period
S1 Start step
S2 Solenoid valve opening step
S3 Load application step
S4 Solenoid valve closing step
Tc Solenoid valve closing timing
To Solenoid valve opening timing
Y1 Decrease amount
Y2 Recovery time
t1 First time
T2 Second time
T1 Timing when application of a load to the emergency generator starts
Ts1 Timing when the engine rotation speed recovers
Ts2 Timing when the engine rotation speed changes from decreasing to increasing

The invention claimed is:

1. A supercharging assist device for assisting supercharging of a turbocharger mounted to an emergency diesel power generation set, the supercharging assist device comprising:
a supply source capable of discharging assist air;
an assist air line having a first end connected to the supply source and a second end connected to a compressor of the turbocharger, the assist air line being configured such that the assist air flows through the assist air line from the supply source toward the compressor;
a solenoid valve disposed in the assist air line; and
a control device configured to be capable of controlling opening and closing of the solenoid valve,
wherein the emergency diesel power generation set is configured such that the engine is operated within a high idle rotation speed range set in advance in a predetermined period until a load is applied to the engine, and
wherein the control device is configured to control the solenoid valve to open a first time before a point of time when the load is applied to the engine in the predetermined period.

2. The supercharging assist device according to claim 1, wherein the control device is configured to control the solenoid valve to close a second time after the point of time when the load is applied to the engine.

3. The supercharging assist device according to claim 2, wherein the second time is longer than a period of time from the point of time when the load is applied to the engine until when a rotation speed of the engine changes from decreasing to increasing.

4. The supercharging assist device according to claim 1, wherein the first time is not less than one second and less than ten seconds.

5. A supercharging assist method for assisting supercharging of a turbocharger mounted to an emergency diesel power generation set,
wherein the emergency diesel power generation set comprises:
a supply source capable of discharging assist air;
an assist air line having a first end connected to the supply source and a second end connected to a compressor of the turbocharger, the assist air line being configured such that the assist air flows through the assist air line from the supply source toward the compressor; and
a solenoid valve disposed in the assist air line,
wherein the emergency diesel power generation set is configured such that the engine is operated within a high idle rotation speed range set in advance in a predetermined period until a load is applied to the engine, and
wherein, the method comprises a step of opening the solenoid valve a first time before a point of time when the load is applied to the engine in the predetermined period.

* * * * *